(12) United States Patent
Okabe et al.

(10) Patent No.: US 7,278,237 B2
(45) Date of Patent: Oct. 9, 2007

(54) TRANSPLANT PRODUCTION SYSTEM

(75) Inventors: Katsuyoshi Okabe, Chuo-ku (JP); Kazuo Tsuchiya, Chuo-ku (JP); Akio Nakaminami, Chuo-ku (JP); Junya Fuse, Chuo-ku (JP)

(73) Assignee: Taiyo Kogyo Co., Ltd., Tokyo (JP)

( * ) Notice: Subject to any disclaimer, the term of this patent is extended or adjusted under 35 U.S.C. 154(b) by 207 days.

(21) Appl. No.: 10/522,773

(22) PCT Filed: Sep. 20, 2002

(86) PCT No.: PCT/JP02/09678

§ 371 (c)(1),
(2), (4) Date: Jan. 31, 2005

(87) PCT Pub. No.: WO2004/026023

PCT Pub. Date: Apr. 1, 2004

(65) Prior Publication Data

US 2006/0162246 A1 Jul. 27, 2006

(51) Int. Cl.
*A01G 31/00* (2006.01)
*A01G 9/00* (2006.01)

(52) U.S. Cl. .............................................. 47/60; 47/17

(58) Field of Classification Search ................ 47/59 R, 47/60, 61, 62 A, 17
See application file for complete search history.

(56) References Cited

U.S. PATENT DOCUMENTS 875,235 A * 12/1907 Bastel ............................ 47/82

(Continued)

FOREIGN PATENT DOCUMENTS

JP 3026253 1/2000

(Continued)

OTHER PUBLICATIONS

"Greenhouse Production of Germera Daisies" Kessler, Jr., J. R., Feb. 1999 ACES Publications, ANR-1144 http://www.aces.edu/pubs/docs/A/ANR-1144/.*

(Continued)

*Primary Examiner*—Teri Pham Luu
*Assistant Examiner*—Joseph W Sanderson
(74) *Attorney, Agent, or Firm*—Wenderoth, Lind & Ponack, L.L.P.

(57) ABSTRACT

A system for transplant production comprises: at least one air conditioner installed in a completely light shielding closed structure surrounded by a thermally insulated wall, for controlling temperature and humidity of air in the closed structure; at least one box-shaped culturing module disposed in an internal space of the closed structure, having a front face opening which is opened to the internal space of the closed structure; a plurality of transplant production shelves arranged vertically in a multi-layer in the culturing module to form a transplant production space between upper and lower transplant production shelves; a plurality of plug trays for holding a plant growing medium mounted on each transplant production shelf; a sub-irrigation unit capable of irrigation from a bottom of the plug trays mounted on each transplant production shelf; an artificial lighting unit provided on a back of each transplant production shelf for irradiating light to the lower plug trays; and at least one air fan fixed to a back wall of each transplant production shelf of the culturing module. By sucking air whose temperature and humidity have been controlled by the air conditioner using the air fan from the front face opening of the culturing module and sending the air to a rear of the back wall of each transplant production shelf, temperature-controlled and humidity-controlled air can be generated.

19 Claims, 5 Drawing Sheets

U.S. PATENT DOCUMENTS

| | | | | |
|---|---|---|---|---|
| 1,454,422 A | * | 5/1923 | Abe | 47/58.1 R |
| 2,897,631 A | * | 8/1959 | Howsley, Jr. et al. | 47/60 |
| 2,928,211 A | | 3/1960 | Martin | |
| 2,940,218 A | * | 6/1960 | Carter | 47/62 R |
| 2,952,096 A | * | 9/1960 | Hughes et al. | 47/60 |
| 3,458,951 A | * | 8/1969 | Martin | 47/60 |
| 3,772,827 A | * | 11/1973 | Ware | 47/39 |
| 4,493,163 A | * | 1/1985 | de Monbrison | 47/61 |
| 4,569,150 A | * | 2/1986 | Carlson et al. | 47/17 |
| 4,837,973 A | * | 6/1989 | Snekkenes | 47/81 |
| 4,914,858 A | * | 4/1990 | Nijssen et al. | 47/1.01 R |
| 4,982,527 A | * | 1/1991 | Sprung | 47/59 R |
| 5,101,593 A | * | 4/1992 | Bhatt | 47/17 |

FOREIGN PATENT DOCUMENTS

| | | |
|---|---|---|
| JP | 2000272711 A * | 10/2000 |
| JP | 2001-346450 | 12/2001 |

OTHER PUBLICATIONS

"Development of an injection type sub-irrigation unit for plug tray" presented in the joint meeting of three scientific societies of The Society of Agricultural Meteorology of Japan, Japanese Society of Environmental Control in Biology, and Japanese Society of High Technology in Agriculture in 1999.

"Simplification of an automatic irrigation unit on the basis of evapotranspiration measurement of plug seedlings population" presented in the joint meeting of The Society of Agricultural Meteorology of Japan and Japanese Society of Environment Control in Biology in 2000.

\* cited by examiner

TRANSPLANT PRODUCTION SYSTEM

TECHNICAL FIELD

The present invention relates to a system for transplant production with multi-layer shelving in a closed space. More specifically, the present invention relates to a transplant production system using an artificial light source, an air conditioner and an automatic irrigation unit, and capable of realizing a stable transplant production environment not influenced by an external environment and efficiently producing high-quality plug seedlings under a uniform growing condition.

BACKGROUND ART

Conventionally, as a method for growing seedlings of various plants, there is a transplant production method represented by a plant factory. This transplant production method is a method for stably growing high-quality uniform seedlings through labor-savings at a low cost by using a closed-type transplant production system including an artificial light source, air conditioner and an automatic irrigation unit to thereby artificially control light quantity, temperature, humidity, wind speed and irrigation quantity in a transplant production space to optimum states.

As this type of closed-type transplant production system, an artificial environmental system is disclosed in Japanese Patent No. 3026253. In this system, an air conditioning chamber is formed inside of a ceiling wall of a box-shaped outer chamber constituted by a thermal insulating material, a blowing chamber and a suction chamber are formed inside of opposed side walls of the outer chamber, respectively, and transplant production boxes are removably disposed in a multi-layer manner between the blowing chamber and the suction chamber. Air in the system is blown into a transplant production space from a honeycomb-structural wall of the blowing chamber and sucked by passing through a porous-plate wall of the suction chamber, and sent to the blowing chamber again by passing through a ventilation flue in the air conditioning chamber to thereby circulate the air. This circulation air is adjusted in terms of temperature and humidity by an air conditioner and blower positioned in the air conditioning chamber and circulated. However, in such a system described above, since the air conditioning chamber, the blowing chamber and the suction chamber are formed inside of the outer chamber, there is a problem in that utilization efficiency of transplant production space in the outer chamber is deteriorated. Also, since special rectifying structure for uniformly blowing air from the blowing chamber is used, structure of the system becomes complex.

Moreover, as an automatic irrigation unit used for this type of transplant production system, there is a unit disclosed by a report entitled, "Development of an injection type sub-irrigation unit for plug tray", presented in a joint meeting of three scientific societies, namely, The Society of Agricultural Meteorology of Japan, Japanese Society of Environment Control in Biology and Japanese Society of High Technology in Agriculture, in 1999. The automatic irrigation unit reported here injects proper amounts of water and a culture solution to a culture medium for a short time by inserting a plurality of nozzles into a plug tray from bottom holes thereof. This irrigation unit has a feature that excess water or excess culture solution is not discharged because injected water does not leak from the bottom holes of the plug tray. It is necessary in such an irrigation unit, however, to prepare a large number of nozzles to be inserted into all of the bottom holes formed on bottom walls of tens to hundreds of plugs for a single plug tray, mechanically insert these nozzles into all of the bottom holes, and then inject an equal amount of water from each of these nozzles. Thus, in order to realize these requirements, there is a defect in that a complex and expensive mechanism is required.

Further, as another automatic irrigation unit, there is a unit disclosed by a report entitled, "Simplification of an automatic irrigation unit on the basis of evapotranspiration measurement of plug seedlings population", presented in a joint meeting of The Society of Agricultural Meteorology of Japan and Japanese Society of Environment Control in Biology in 2000. In this automatic irrigation unit, an amount of evapotranspiration of a plant body and a culture medium is measured as a change in seedling population weight for each plug tray by placing the plug tray on a pan balance, a switch contact point is set to a pointer of the balance, and the switch contact point directly detects movement of the pointer to designate start of irrigation to the seedling population. This unit has a feature in that irrigation using a proper amount of water can be conducted without discharging excess water, since irrigation is started on the basis of the amount of evapotranspiration and irrigation using a minimum necessary amount of water being performed by using a subtimer. However, this report reveals that, since operation of the pointer has a mechanical resistance and movement of the pointer is directly influenced by gravity, operation of the pointer is incomplete or operational accuracy thereof has a problem.

Furthermore, Japanese Patent Laid-Open Specification No. 2001-346450 discloses a sub-irrigation unit, i.e. a watering unit capable of watering from a bottom of a plug tray, for use in a transplant production system with multi-layer shelving in a closed space. This sub-irrigation unit is provided with a shallow quadrangular box having three sides surrounded by side walls and having a bottom wall face. A drainage groove is formed at a side of the box having no side wall. A water supply pipe is disposed on a side wall face of the side of the box opposed to the drainage groove. A porous sheet of a synthetic resin is put on a bottom wall face of the box and plug trays are mounted on the porous sheet. According to the sub-irrigation unit having the above-described structure, water supplied from the water supply pipe is absorbed by the porous sheet due to its capillary action and spreads entirely to the bottom wall face of the box in a short time to thereby attain a water pool state at a predetermined water level and uniformly supply water to culture media contained in respective plugs from plug holes formed at a bottom of the respective plugs arrayed in the plug tray due to a capillary phenomenon. Since the culture medium in each plug comes into a water saturated state in a short time due to the capillary phenomenon, it is not necessary to maintain the pool state for a long time. However, unless a pump having a large discharge quantity is used, water does not spread to the bottom wall face of the box in its entirety and therefore a pool state is not realized. After irrigation is stopped, water remaining in the porous sheet is discharged to the drainage groove from an end of the porous sheet hanging down into the drainage groove. However, since the bottom of each plug contacts the porous sheet even after irrigation is stopped, the vicinity of the plug hole is easy to maintain in a wet state. As a result, roots of seedlings extend to outside from the plug hole, and therefore a problem occurs in a removal operation of seedlings from the plugs, and there is a danger of damaging the roots. To prevent the roots of seedlings from extending up to the vicinity of the plug hole by drying the vicinity of the plug hole after irrigation is stopped, it is proposed to form a plurality of small protrusions on the plug bottom so that the plug bottom does not directly contact with the porous sheet. However, a satisfied dry state is not always obtained.

SUMMARY OF THE INVENTION

In view of the above circumstances, the inventors of the present invention have eagerly studied in order to overcome the above-described problems present in the technical field of culturing seedlings using a closed-type transplant production system and provide a transplant production technique capable of efficiently producing uniform and high-quality seedlings at a low energy and a low cost. The present invention has been accomplished as a result of such studies.

The following are objects of the present invention:

(1) To provide a closed-type transplant production system having a high space utilization rate in a closed space;

(2) To provide an energy-saving transplant production system capable of efficiently circulating air in a closed space by a simple structure without using complex rectifying structure, and capable of realizing effective temperature and humidity control by minimum necessary power; and (3) To provide a transplant production system having a sub-irrigation unit requiring only minimum necessary irrigation to culture seedlings and capable of effectively drying a bottom of plug trays when irrigation is stopped.

A transplant production system according to the present invention comprises:

at least one air conditioner installed in a completely light shielding closed structure surrounded by a thermally insulated wall, for controlling temperature and humidity of air in the closed structure;

at least one box-shaped culturing module disposed in an internal space of the closed structure, having a front face opening which is opened to the internal space of the closed structure;

a plurality of transplant production shelves arranged vertically in a multi-layer manner in the culturing module to form a transplant production space between upper and lower transplant production shelves;

a plurality of plug trays for holding a plant growing medium mounted on each transplant production shelf;

a sub-irrigation unit capable of irrigation from a bottom of the plug trays mounted on each transplant production shelf;

an artificial lighting unit provided on a back of each transplant production shelf, for irradiating light to the lower plug trays; and at least one air fan fixed to a back wall of each transplant production shelf of the culturing module, whereby air whose temperature and humidity have been controlled by the air conditioner is sucked by the air fan from the front face opening of the culturing module and sent to the rear of the back wall of each transplant production shelf to circulate the air in the closed structure.

It is also possible that a plurality of culturing modules are disposed in the internal space of the closed structure so that they are arranged in one line with their front face openings facing in the same direction.

Alternatively, it is possible that a plurality of culturing modules are arranged in two lines with their front face openings in the same line facing in the same direction, and the front face openings in one line are opposed to the front face openings in the other line, and a work space and concurrently an air circulation path are formed between the two lines of the culturing modules.

The sub-irrigation unit mounted on each transplant production shelf is preferably provided with a shallow quadrangular box-shaped irrigation tray having three sides surrounded by side walls and having a bottom wall face, a water supply pipe for supplying water into the irrigation tray is disposed in the irrigation tray, a drainage groove joined to the bottom wall face is formed at a side of the irrigation tray having no side wall, with the drainage groove and the bottom wall face being partitioned by a dam, and structure for maintaining a gap between the bottom wall face of the irrigation tray and a bottom of the plug tray at a time of mounting the plug tray on the bottom wall face of the irrigation tray is provided on the bottom wall face of the irrigation tray.

DETAILED DESCRIPTION OF THE PREFERRED EMBODIMENTS

A preferable example of a transplant production system of the present invention is described below by referring to an example shown in FIGS. 1 and 2. A transplant production system of the present invention is a closed-type transplant production system constituted by arranging a plurality of box-shaped culturing modules 3, 4, 5, and 6 (four in the case of this illustrated example) in an internal space of a completely light shielding closed structure 1 surrounded by a thermally insulated wall. In the present invention, the closed structure denotes a structure having an internal space closed by being surrounded by a wall for cutting off external air temperature and natural light. A typical structure is a box-shaped hexahedron obtained by combining reinforcing bars, slates and a thermal insulating material. An external shape of the structure is not restricted to a boxy shape. It is allowed to use a barrel shape, hemi-cylindrical shape or hemispherical shape.

A size of an internal space of the closed structure 1 may be determined to proper dimensions depending upon a number of culturing modules to be arranged in the internal space. In the case of the example shown in FIG. 1, two culturing modules 3 and 4 are arranged in one line with their front face openings facing in the same direction. In addition, two culturing modules 5 and 6 are also arranged in one line with their front face openings facing in the same direction. These two lines of the culturing modules are disposed in the internal space of the closed structure 1 so that the front face openings in one line are opposite to the front face openings in another line. Moreover, a work space in which one or more workers can work is formed between these two lines of the culturing modules. In order to improve an area utilization rate and space utilization rate of the internal space of the closed structure 1, it is preferable to form the work space as small and narrow as possible. When the culturing modules 3 to 6 are displaced in the closed structure 1, a path of air passing through the culturing modules is formed by providing a space having a width of about 50 to 300 mm between an inside wall face of the closed structure and backs of the culturing modules.

Figure 1:
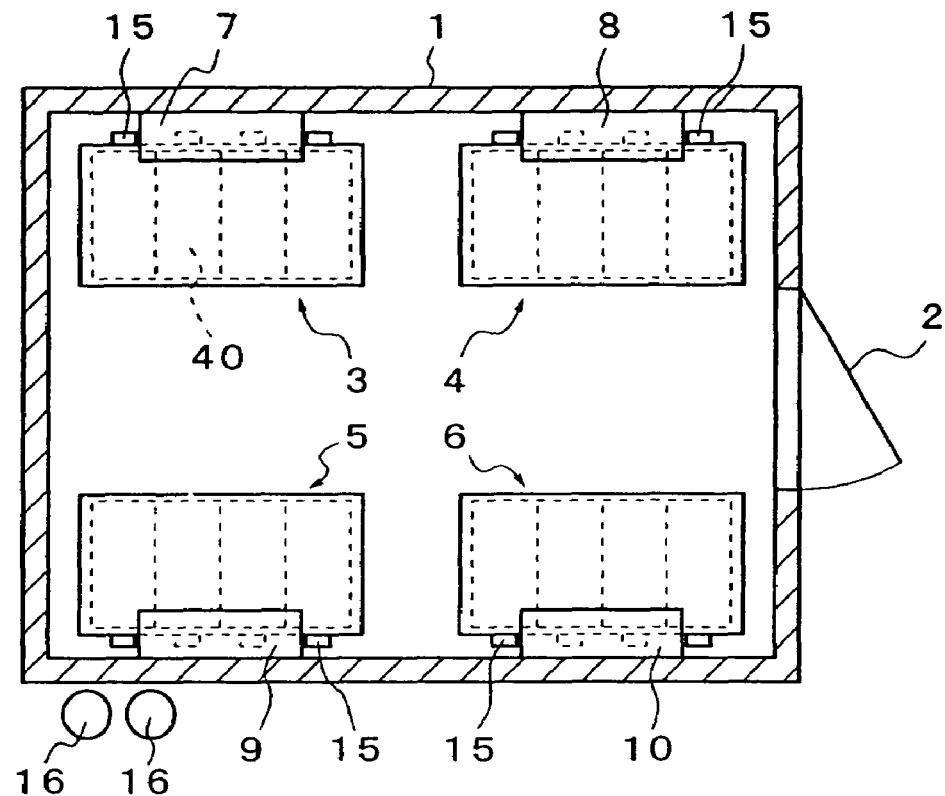
FIG. 1 is a schematic plan view showing an example of a transplant production system of the present invention.
Figure 2:
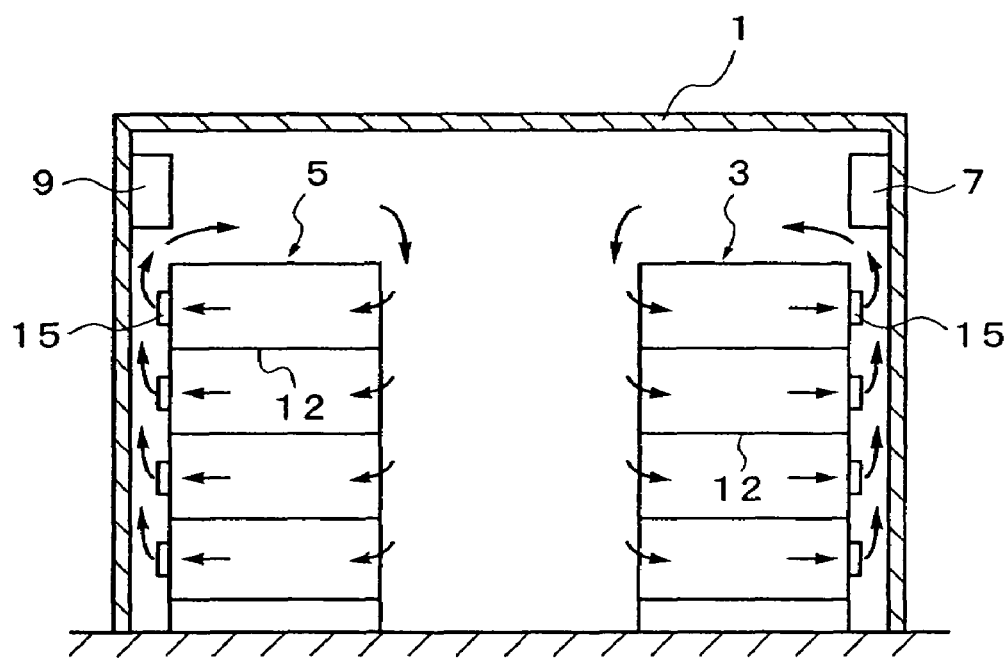
FIG. 2 is a schematic longitudinal sectional view showing a flow of air in an internal space of the transplant production system shown in FIG. 1.

Concerning internal dimensions of the closed structure 1 in the example shown in FIGS. 1 and 2, a width is 3,400 mm, a depth is 2,500 mm, and a height is 2,200 mm. Providing an air curtain inside of a hinged door 2 of an entrance is preferable because it is possible to prevent outside air from coming in when a worker passes through the door 2.

The closed structure 1 is provided with an air conditioner having a function for controlling temperature and humidity of air in the internal space and circulating air whose temperature and humidity have been controlled to predetermined conditions. Indoor units 7, 8, 9, and 10 of the air conditioner are fixed to an upper portion of the inner face of the closed structure side wall and an outdoor unit (not illustrated) is positioned to the outside of the closed structure 1. One air conditioner may control the temperature and humidity of the internal space in its entirety depending on the size of the closed structure. However, in order that temperature-controlled and humidity-controlled air is effectively circulated in the internal space of the closed structure 1, it is preferable to use a plurality of indoor units of the air conditioner corresponding to the number of the culturing modules, and fix each indoor unit to the upper portion of the inner face of the closed structure side wall located at the rear of the back wall of each culturing module.

Figure 3:
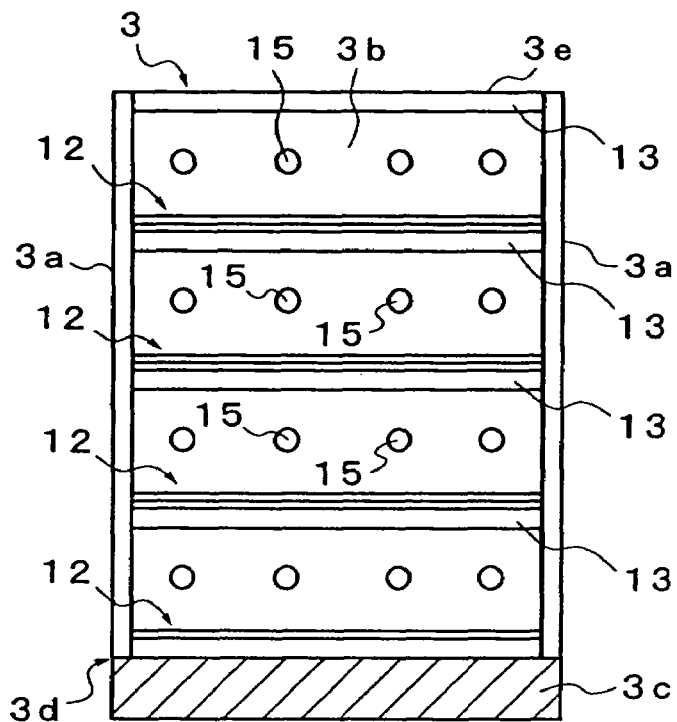
FIG. 3 is a front view showing an example of a culturing module used for the transplant production system of the present invention.
Figure 4:
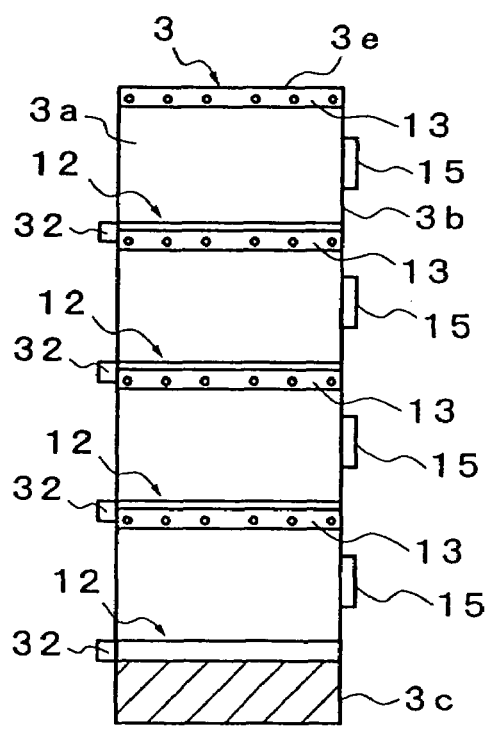
FIG. 4 is a side view of the culturing module shown in FIG. 3.

As shown in FIGS. 3 and 4, the culturing module 3 disposed in the internal space of the closed structure 1 is provided with a boxy outer shape having side walls 3a and a back wall 3b formed on side and back faces thereof, respectively, and having a front face opening. In the culturing module 3, a plurality of culturing shelves 12 are vertically arranged in a multi-layer at certain intervals, whereby area utilization efficiency of the transplant production space is improved. It is preferable that a height of each culturing module 3 is set to about 2,000 mm at which a worker can work, a width of each transplant production shelf 12 is set to, for example, about 1,000 to 2,000 mm at which a plurality of plug trays of synthetic resin each having tens to hundreds of plugs (small pots) arrayed in a grid pattern can be mounted and a temperature and humidity in each shelf can be controlled at a constant value, and a depth of each transplant production shelf 12 is set to 500 to 1,000 mm. Concerning external dimensions of the culturing module 3 of the illustrated example, a height is 1,650 mm, a width is 1,300 mm, and a depth is 650 mm and four plug trays 40 (refer to FIG. 1) are mounted on each transplant production shelf 12. Concerning dimensions of one plug tray, a width is about 300 mm and a length is about 600 mm in general.

Transplant production shelves 12 arranged in the multilayer in the culturing module 3 (four stages in the example shown in FIG. 3) are almost horizontal and a transplant production space is formed between the transplant production shelves 12. The transplant production shelf located at a lowest-stage is mounted on a pedestal 3c of the culturing module and horizontality of the transplant production shelves 12 can be adjusted by an adjuster 3d set on the pedestal. By decreasing an interval between adjacent transplant production shelves and increasing a number of transplant production shelves, it is possible to improve a space utilization rate. However, when the interval between the adjacent transplant production shelves is too small, there are disadvantages in that operability for removing or inserting plug trays is deteriorated and a maximum length of seedlings cannot be secured. Therefore, it is preferable that the interval is set to about at least 300 mm. The transplant production shelves 12 are formed preferably by using metallic plates, a metallic net, and metallic bars.

On each of the transplant production shelves 12 are mounted a sub-irrigation unit to be described herein later and a plurality of plug trays. Further, an artificial lighting unit 13 is provided on a back of each transplant production shelf 12 to irradiate light to plants grown in the plug trays of the transplant production shelf just below the lighting unit 13. In the case of the transplant production shelf located at a highest-stage, the artificial lighting unit 13 is provided on a back of the top wall 3e of the culturing module.

A fluorescent lamp is preferable as a light source of the artificial lighting unit 13. It is possible to properly select candlepower and length of the fluorescent lamp in accordance with the width and length of the transplant production shelf 12 and the interval between adjacent transplant production shelves 12. For example, when a transplant production shelf having a width of 1,200 mm and a length of 600 mm is used and the interval between adjacent transplant production shelves is 350 mm, it is possible to attach four to eight fluorescent lamps, each of which has a length of 1,200 mm and a candlepower of 32 to 45 W, in parallel on the back of each transplant production shelf.

As shown in FIG. 3, a plurality of air fans 15 are fixed to back wall 3b of each stage of the transplant production shelves 12. By operating the air fans 15, it is possible to generate air circulation flows shown by arrows in FIG. 2 in the internal space of the closed structure 1. That is, the air whose temperature and humidity have been controlled by indoor units 7 to 10 of the air conditioner is sucked into the transplant production space of each stage of the transplant production shelves 12 from the front face opening of each of the culturing modules 3 to 6, and discharged to the rear of the back wall of each culturing module. The air discharged to the rear of the back wall of each culturing module is sucked into the indoor units 7 to 10 of the air conditioner, and, after the temperature and humidity of the air have been controlled, blown out to the front face openings of the culturing modules 3 to 6. When two lines of the culturing modules 3 and 4 and the culturing modules 5 and 6 are arranged so that the work space is formed between them as in the example shown in FIGS. 1 and 2, the work space functions concurrently as an air circulation path. Therefore, it is possible to provide an effective circulation flow.

When the circulation flow passes through the transplant production shelves 12 of the culturing modules 3 to 6, the circulation flow is accompanied by water vapor evaporated from irrigation units, culture media and plant seedlings, and also by heat discharged from the artificial lighting units 13. By controlling the temperature and humidity of the circulation flow using the indoor units 7 to 10 of the air conditioner and continuously circulating the flow, it is possible to keep the internal space of the closed structure 1 at a temperature and humidity environment optimum for plant growth.

When the width of each transplant production shelf 12 is small, one air fan 15 may be fixed to the back wall 3b of each stage of the transplant production shelves. However, such a layout is not preferable because of occurrence of uneven ventilation when a large width of the transplant production shelf 12 is used. As shown in FIG. 3, by disposing a plurality of air fans 15 in each stage of the transplant production shelf 12 (one air fan is disposed for each of four plug trays; total of four air fans in the example shown in FIGS. 1 and 3), it becomes possible to eliminate uneven ventilation, and uniform ventilation and uniform air circulation are realized. When a plurality of air fans are disposed, it is allowed that air suction force per one air fan is comparatively small.

A sub-irrigation unit is mounted on each of the transplant production shelves 12 arranged in the multi-layer in the culturing modules 3 to 6 and employs a system in which irrigation is performed from a bottom of the plug trays mounted on each transplant production shelf. An example of the sub-irrigation unit is shown by a top view in FIG. 5, a perspective view in FIG. 6, and a sectional view in FIG. 7. This illustrated sub-irrigation unit 30 is provided with a shallow quadrangular box-shaped irrigation tray 31 having three sides surrounded by side walls 31a, 31b and 31c and a bottom wall face 31d. A drainage groove 32 joined to the bottom wall face 31d is formed at a side of the irrigation tray 31 having no side wall, and a drainage port 32a is formed at one end of the drainage groove 32. Further, a water supply pipe 33 for supplying water (a culture solution containing fertilizer) into the irrigation tray 31 is also disposed. The water supply pipe 33 may be disposed in any position as long as water can be supplied into the irrigation tray 31 from that position. In the case of the illustrated example, the water supply pipe 33 is disposed on the side wall 31a of the irrigation tray opposite to the drainage groove 32 and water is supplied from a plurality of small holes 33a formed in the water supply pipe. Moreover, the drainage groove 32 and the bottom wall face 31d are partitioned by a dam 34 and a cutout 34a is formed on a part (both ends in the case of the illustrated example) of the dam 34.

The sub-irrigation unit used in the present invention is characterized in that structure for maintaining a gap between the bottom wall face of the irrigation tray and the bottom of the plug tray is provided. The gap is maintained at a time of mounting the plug tray on the bottom wall face of the irrigation tray. In the example shown in FIGS. 5 to 7, this gap holding structure is constituted by a plurality of ribs 35 formed on the bottom wall face 31d of the irrigation tray. The ribs 35 extend in parallel with each other toward the drainage groove 32, and the plug trays 40 are mounted on these ribs 35.

It is allowed that the irrigation tray 31 is made of a metal or synthetic resin, a width and thickness of the irrigation tray 31 are substantially the same as those of the transplant production shelf 12 arranged in each stage in the culturing modules 3 to 6, and a depth is set to about 30 to 50 mm. In the example of the illustrated sub-irrigation unit 30, dimensions are such that drainage grooves 32 protrude from the front face openings of the culturing modules at the time of mounting the irrigation trays 31 on the transplant production shelves of the culturing modules 3 to 6 (refer to reference numeral 32 in FIG. 4). By protruding the drainage groove 32 from the front face opening of its culturing module, water discharged from the drainage port 32a of the drainage groove 32 of the irrigation tray 31 mounted on each stage of the transplant production shelves 12 is easily collected and drained to outside of the closed structure 1.

When a predetermined quantity of water is continuously supplied from the small holes 33a formed in the water supply pipe 33 of the sub-irrigation unit 30, the water is spread over the bottom wall face 31d of the irrigation tray and stopped by the dam 34 to thereby accumulate up to a predetermined water level and form a water pool state. While water is supplied from the water supply pipe 33, water leaks little by little from the cutouts 34a (width of about 10 mm, for example) formed in the dam 34 into the drainage groove 32. However, by adjusting a supplied water quantity and a water quantity leaking from the cutouts, the pool state having a water level of about 10 to 12 mm can be maintained in the irrigation tray 31. In this case, by narrowing a width of the cutouts to decrease outflow of the water, the supplied water quantity can be decreased and a small water supply pump may be used. When the pool state having such a water level as described above is maintained, water is soaked up, due to capillary action, to culture media in plugs 41 from plug holes 42 formed on bottoms of the plugs 41 arrayed in the plug tray 40 mounted on the ribs 35 (average height of about 7 mm, for example), and thus the culture media in all of the plugs 41 come into a water saturated state in a short time. In addition, since the culture media in all of the plugs 41 arrayed in the plug tray 40 come into the water saturated state uniformly, it is unnecessary to continue irrigation anymore. Thus, it is possible to apply uniform irrigation to all the plugs 41 of the plug tray 40 mounted on each stage of the transplant production shelves without accurately equalizing the water quantity supplied to each stage of the transplant production shelves 12.

When supply of water from the water supply pipe 33 is continued even after culture media in all the plugs of the plug tray come into the water saturated state, excess water is drained into the drainage groove 32. After automatically stopping the supply of water, although most of the water in the irrigation tray 31 is drained in a short time to the drainage groove 32 through the cutouts 34a formed in the dam 34, some water remains on the bottom wall face 31d of the irrigation tray to produce a wet state. However, since the bottom of the plug tray 40 is raised from the bottom wall face 31d of the irrigation tray by virtue of the ribs 35, a gap is maintained between the bottom of the plug tray 40 and the bottom wall face 31d of the irrigation tray. By flowing the temperature-controlled and humidity-controlled air through the gap, the vicinity of the plug holes 42 is made to come into a dry state in a short time.

Figure 5:
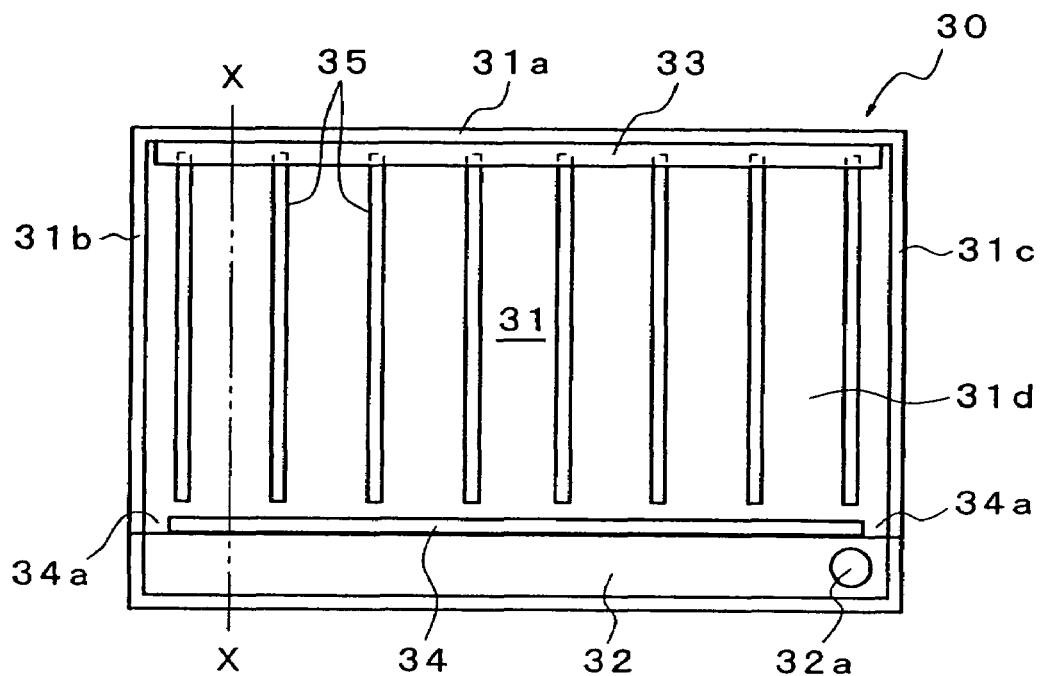
FIG. 5 is a plan view showing an example of a sub-irrigation unit used for the transplant production system of the present invention.
Figure 6:
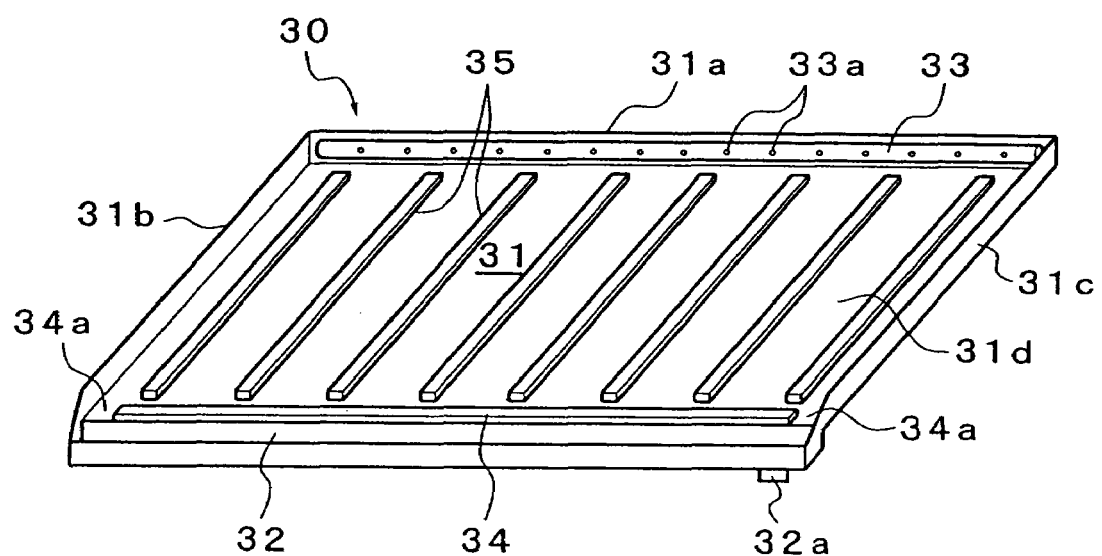
FIG. 6 is a perspective view of the sub-irrigation unit shown in FIG. 5.
Figure 7:
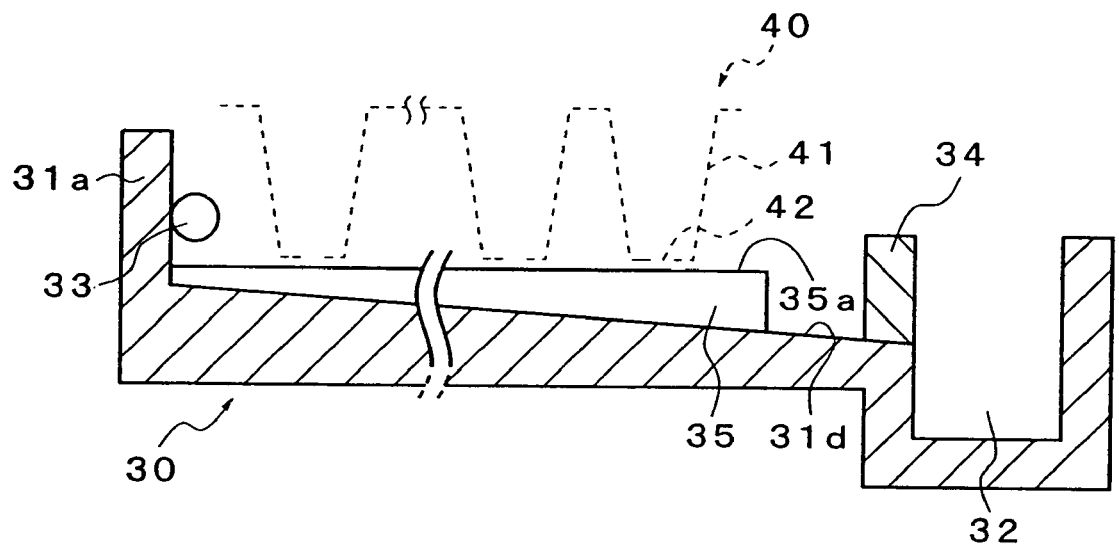
FIG. 7 is a schematic longitudinal sectional view along line X-X in FIG. 5.

When the vicinity of the plug holes 42 formed at the bottom of the plug tray 40 is kept in a wet state, roots of seedlings easily extend toward the water. However, when the vicinity of the plug holes 42 is kept in a dry state, roots of seedlings do not extend to this location in the dry state. This phenomenon is referred to as an air pruning effect and denotes a state in which roots are pruned by using an air layer as a boundary. According to the example of the sub-irrigation unit 30 as shown in FIGS. 5 to 7 used for the transplant production system of the present invention, it is possible to securely bring the vicinity of the plug holes 42 into a dry state in a short time and positively generate the air pruning effect. As a result, it is possible to prevent roots of seedlings from extending outside from the plug holes 42. Therefore, at a time of fix planting of produced seedlings, a removal operation from the plugs 41 of seedlings becomes easy and roots are not damaged.

In the case of the example of the illustrated sub-irrigation unit 30, as shown by the sectional view in FIG. 7, the bottom wall face 31*d* of the irrigation tray 31 is tilted in a direction toward the drainage groove 32. Thereby, it is possible to drain water to the drainage groove 32 in a short time when irrigation is stopped. Moreover, in the case where the bottom wall face 31*d* is tilted, it is preferable to change heights of the ribs 35 so that top surfaces 35*a* of the ribs become horizontal, such that the plug tray 40 mounted on the ribs can be kept horizontal.

Figure 8:
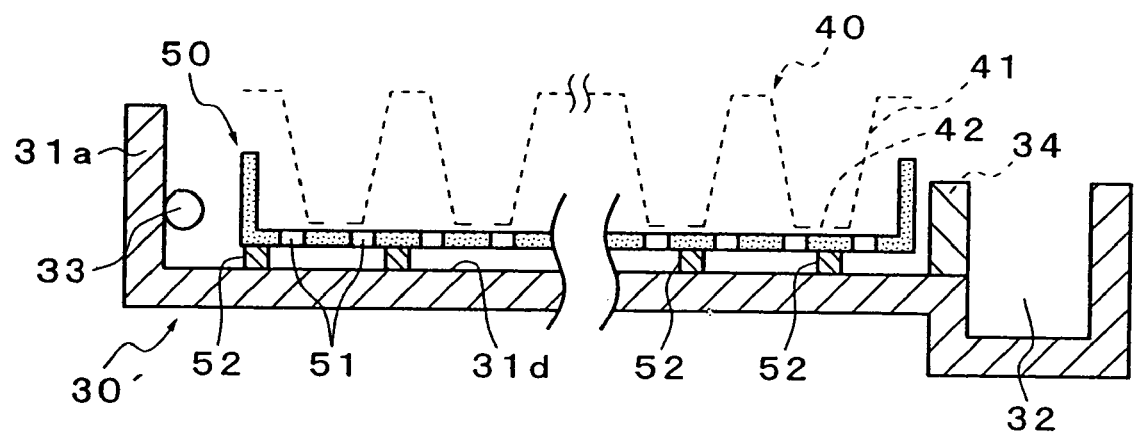
FIG. 8 is a schematic longitudinal sectional view showing another example of the sub-irrigation unit used for the transplant production system of the present invention.

FIG. 8 shows another example of the sub-irrigation unit used for the present invention. For omitting description, members same as those in FIGS. 5 to 7 are designated by the same numerals. In sub-irrigation unit 30' as shown in FIG. 8, when plug tray 40 is mounted on bottom wall face 31*d* of an irrigation tray, a lower tray 50 is intervened between the bottom wall face 31*d* of the irrigation tray and the plug tray 40. The lower tray 50 has a rigidity capable of supporting the plug tray 40 having plugs 41 containing culture media, and is provided with a plurality of small holes 51 formed on a bottom wall thereof and a plurality of protrusions 52 attached to a back face thereof. These protrusions 52 function as structure for maintaining a gap between the bottom wall face 31*d* of the irrigation tray and the bottom of the plug tray 40 when the plug tray 40 is housed in the irrigation tray together with the lower tray 50.

Also in the sub-irrigation unit 30' as shown in FIG. 8, when a water pool state having a predetermined water level is realized by supplying water from water supply pipe 33, water is introduced into the lower tray 50 from the small holes 51 of the lower tray 50 and water is soaked up to culture media in the plugs 41 from plug holes 42 formed in bottoms of the plugs 41 of the plug tray 40 through capillary action. After stopping supply of water from the water supply pipe 33, excess water is drained to drainage groove 32, and a small amount of water remains on the bottom wall face 31*d* of the irrigation tray. Even if the bottom wall face 31*d* is in a wet state, the gap is maintained between the bottom of the plug tray 40 and the bottom wall face 31*d* of the irrigation tray by the protrusions 52 on the back face of the lower tray 50, and temperature-controlled and humidity-controlled air flows through the gap to thereby make the vicinity of plug holes 42 a dry state in a short time.

Also in the case of the example in FIG. 8, it is possible, similarly to the case of the example in FIGS. 5 to 7, to drain water to the drainage groove 32 in a short time when irrigation is stopped, by tilting the bottom wall face 31*d* of the irrigation tray in a direction toward the drainage groove 32.

The plug tray 40 mounted on the irrigation tray 31 of the sub-irrigation units 30 and 30' mounted on each stage of the transplant production shelves 12 is formed by arraying tens to hundreds of plugs 41 in a grid pattern and integrating them into a tray shape. A width of one plug tray is 300 mm and its length is about 600 mm, and various types of plug trays are commercially available. In general, the plug tray is manufactured from a synthetic resin sheet by a forming method utilizing differential pressure. As a shape of the plug 41, an inverted frustoconical shape is preferably employed and either of a circular cone or pyramid may be used. It is preferable to use a plug having a depth of approximately 15 to 50 mm and a capacity of approximately 4 to 30 ml, and having a plug hole 42 in its bottom and capable of irrigation from the bottom.

Figure 9:
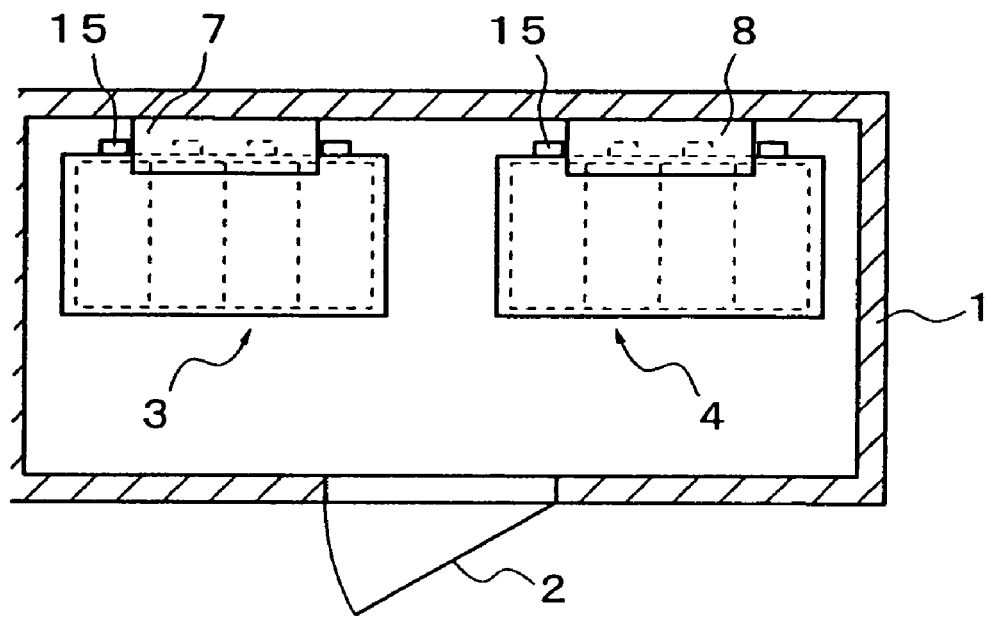
FIG. 9 is a schematic plan view showing another example of the transplant production system of the present invention.
Figure 10:
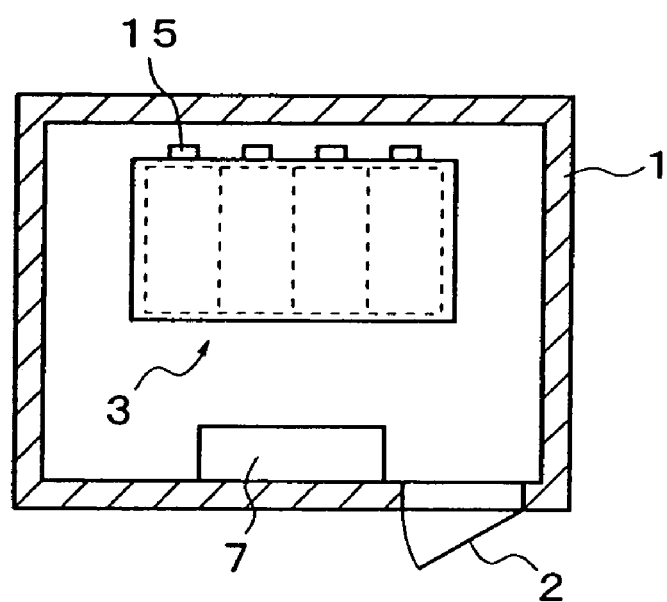
FIG. 10 is a schematic plan view showing still another example of the transplant production system of the present invention.

In the case of the example of the transplant production system of the present invention shown in FIGS. 1 and 2, two lines for a total of four culturing modules 3 to 6, that is, a line of two culturing modules 3 and 4 and a line of two culturing modules 5 and 6, are arranged in the internal space of the closed structure 1 so that the front face openings in one line are opposed to the front face openings in the other line. Since the transplant production system of the present invention has a structure in which culturing modules are arranged in the internal space of the closed structure, it is possible to freely construct a transplant production system corresponding to a scale by properly selecting a size of the closed structure and a number of culturing modules to be arranged in the closed structure. For example, FIG. 9 shows an example in which two culturing modules 3 and 4 are disposed in an internal space of closed structure 1 so that they are arranged with their front face openings facing the same direction. Further, FIG. 10 shows an example in which one culturing module 3 is disposed in an internal space of small closed structure 1. In FIGS. 9 and 10, the members same as those in FIGS. 1 and 2 are designated by the same numerals for omitting their description.

In the transplant production system of the present invention, it is not always necessary to fix the indoor units 7 to 10 of the air conditioner installed in the closed structure 1 to the upper portion of the inner face of the side wall of the closed structure 1 located at the rear of the back wall of the culturing modules 3 to 6. The indoor units may be fixed to any position as long as an air circulation flow can be generated in the internal space of the closed structure by virtue of the indoor units of the air conditioner and the air fans 15 fixed to the back wall of the culturing modules. For example, as shown by the example in FIG. 10, it is also possible to fix indoor unit 7 of the air conditioner to an inner face of a side wall of the closed structure 1 opposite to the front face opening of the culturing module 3.

Since the internal space of the closed structure is highly airtight, in a case where a normal ventilation condition is applied, it is necessary to artificially supply carbon dioxide gas consumed through photosynthesis during culturing of seedlings. Therefore, as shown in FIG. 1, a liquid carbon dioxide cylinder 16 is positioned outside of the closed structure 1 and a carbon dioxide analyzer (not illustrated) is positioned inside of the closed structure. It is possible to maintain carbon dioxide concentration in the internal space at a predetermined value by a system for discharging a necessary amount of carbon dioxide from the carbon dioxide cylinder 16 to the internal space of the closed structure in accordance with a signal sent from the carbon dioxide analyzer, when the carbon dioxide concentration in the internal space of the closed structure measured by the carbon dioxide analyzer becomes no more than a certain value.

By culturing seedlings in the internal space of the closed structure using the transplant production system of the present invention, it is possible to automatically control environmental conditions such as quantity of light, temperature, humidity, carbon dioxide and water preferable to culture seedlings. In addition, since all the seedlings on each of the transplant production shelves in the culturing modules with multi-layer shelving can be cultured under the same environment, it is possible to improve uniformity of obtained seedling quality. The seedling quality here denotes external features such as length of hypocotyl, diameter of hypocotyl, leaf color, leaf area and the like, and quality features such as a forming position of a floral bud, presence or absence of bolting and the like.

INDUSTRIAL APPLICABILITY

According to the present invention described above, the following advantages can be obtained.

(1) By virtue of the indoor units of the air conditioner installed in the internal space of the closed structure and the air fans fixed to the back walls of the culturing modules, it is possible to effectively generate a circulation flow of temperature-controlled and humidity-controlled air in the internal space. Therefore, installation of complex rectifying structure is not required and efficient control of temperature and humidity in the closed space can be performed with minimum necessary power. As a result, it is possible to provide an energy-saving and low-cost transplant production system.

(2) A circulation flow of temperature-controlled and humidity-controlled air can effectively be generated by a simple configuration in which the indoor units of the air conditioner and the air fans are disposed in the internal space of the closed structure. Therefore, since it is unnecessary to form an air conditioning chamber, a blowing chamber, a suction chamber and the like in the internal space, a wide space for culturing seedlings can be provided and as a result, the space utilization rate can be improved.

(3) By using the sub-irrigation unit having the dam formed on the bottom wall face of the irrigation tray, a water pool state having a predetermined water level can be easily realized. Thus, since culture media in all plugs of the plug tray can be brought into a water saturated state in a short time by soaking up water from the bottom of the plugs, an amount of necessary irrigation can be minimum.

(4) By using the sub-irrigation unit provided with the gap holding structure between the bottom wall face of the irrigation tray and the bottom of the plug tray, a gap can be maintained between the bottom of the plug tray and the bottom wall face of the irrigation tray at the time of stopping irrigation and the vicinity of the plug holes can be brought into a dry state by circulating temperature-controlled and humidity-controlled air through the gap. As a result, it is possible to prevent roots of seedlings from extending from the plug holes to outside and simplify an operation for removing a seedling from the plug.

The invention claimed is:

1. A system for transplant production, comprising:
a light shielding closed structure including a surrounding thermally insulated wall;
an air conditioner in said closed structure for controlling temperature and humidity of air in said closed structure;
a box-shaped culturing module, having a front face opening, within said closed structure;
transplant production shelves arranged vertically in said culturing module;
a plug tray, for holding a plant growing medium, on each of said shelves;
a sub-irrigation unit, capable of providing irrigation from a bottom of a corresponding said plug tray, on said each of said shelves, said sub-irrigation unit including
  (i) a shallow quadrangular box-shaped irrigation tray having three sides surrounded by side walls and having a bottom wall face,
  (ii) a water supply pipe within said irrigation tray for supplying water into said irrigation tray,
  (iii) a drainage groove joined to said bottom wall face at a side of said irrigation tray having no side wall,
  (iv) a dam partitioning said drainage groove and said bottom wall face, and
  (v) structure on said bottom wall face for maintaining a gap between said bottom wall face and a bottom of said corresponding said plug tray at a time of mounting said corresponding said plug tray on said bottom wall face;
an artificial lighting unit, for irradiating light from above to said corresponding said plug tray, associated with said each of said shelves; and
a fan, associated with said each of said shelves, for sucking air, the temperature and humidity of which have been controlled by said air conditioner, from said front face opening of said culturing module and conveying the air toward a rear end of said culturing module so as to circulate the air within said closed structure.

2. The system according to claim 1, further comprising:
another air conditioner in said closed structure for controlling temperature and humidity of air in said closed structure;
another box-shaped culturing module, having another front face opening, within said closed structure;
additional transplant production shelves arranged vertically in said another culturing module;
another plug tray, for holding a plant growing medium, on each of said additional shelves;
another sub-irrigation unit, capable of providing irrigation from a bottom of a corresponding said another plug tray, on said each of said additional shelves;
another artificial lighting unit, for irradiating light from above to said corresponding said another plug tray, associated with said each of said additional shelves; and
another fan, associated with said each of said additional shelves, for sucking air, the temperature and humidity of which have been controlled by said another air conditioner, from said front face opening of said another culturing module and conveying this air toward a rear end of said another culturing module so as to circulate this air within said closed structure.

3. The system according to claim 2, wherein
said air conditioner is fixed to an upper portion of a wall of said closed structure at the rear end of said culturing module, and
said another air conditioner is fixed to an upper portion of a wall of said closed structure at the rear end of said another culturing module.

4. The system according to claim 3, wherein
said fan is at a rear portion of said each of said shelves and is generally beneath said air conditioner, and
said another fan is at a rear portion of said each of said additional shelves and is generally beneath said another air conditioner.

5. The system according to claim 4, wherein
said wall to which said air conditioner is fixed is spaced from the rear end of said culturing module by a distance within a range of from about 50 mm to 300 mm, and
said wall to which said another air conditioner is fixed is spaced from the rear end of said another culturing module by a distance within a range of from about 50 mm to 300 mm.

6. The system according to claim 3, wherein
said wall to which said air conditioner is fixed is spaced from the rear end of said culturing module by a distance within a range of from about 50 mm to 300 mm, and
said wall to which said another air conditioner is fixed is spaced from the rear end of said another culturing module by a distance within a range of from about 50 mm to 300 mm.

7. The system according to claim 2, wherein
the rear end of said culturing module is spaced from a wall of said closed structure by a distance within a range of from about 50 mm to 300 mm, and
the rear end of said another culturing module is spaced from a wall of said closed structure by a distance within a range of from about 50 mm to 300 mm.

8. The system according to claim 1, wherein
said air conditioner is fixed to an upper portion of a wall of said closed structure at the rear of said culturing module.

9. The system according to claim 8, wherein
said fan is at a rear portion of said each of said shelves and is generally beneath said air conditioner.

10. The system according to claim 9, wherein
said wall to which said air conditioner is fixed is spaced from the rear end of said culturing module by a distance within a range of from about 50 mm to 300 mm.

11. The system according to claim 8, wherein
said wall to which said air conditioner is fixed is spaced from the rear end of said culturing module by a distance within a range of from about 50 mm to 300 mm.

12. The system according to claim 1, wherein
said structure for maintaining a gap between said bottom wall face and the bottom of said corresponding said plug tray comprises ribs extending on said bottom wall face in a direction from said water supply pipe to said drainage groove.

13. The system according to claim 1, wherein
said structure for maintaining a gap between said bottom wall face and the bottom of said corresponding said plug tray comprises protrusions formed on a back surface of a perforated lower tray positioned between said bottom wall face and said corresponding said plug tray.

14. The system according to claim 1, wherein
said dam defines at least one cutout.

15. The system according to claim 1, wherein
said bottom wall face is inclined in a direction away from said drainage groove.

16. The system according to claim 1, further comprising:
another box-shaped culturing module, having another front face opening, within said closed structure;
additional transplant production shelves arranged vertically in said another culturing module;
another plug tray, for holding a plant growing medium, on each of said additional shelves;
another sub-irrigation unit, capable of providing irrigation from a bottom of a corresponding said another plug tray, on said each of said additional shelves;
another artificial lighting unit, for irradiating light from above to said corresponding said another plug tray, associated with said each of said additional shelves; and
another fan, associated with said each of said additional shelves, for sucking air, temperature and humidity of which have been controlled, from said front face opening of said another culturing module and conveying this air toward a rear of said another culturing module so as to circulate this air within said closed structure,
wherein said culturing module and said another culturing module are linearly arranged with said front face opening and said another front face opening facing in the same direction.

17. The system according to claim 1, further comprising:
another box-shaped culturing module, having another front face opening, within said closed structure;
additional transplant production shelves arranged vertically in said another culturing module;
another plug tray, for holding a plant growing medium, on each of said additional shelves;
another sub-irrigation unit, capable of providing irrigation from a bottom of a corresponding said another plug tray, on said each of said additional shelves;
another artificial lighting unit, for irradiating light from above to said corresponding said another plug tray, associated with said each of said additional shelves; and
another fan, associated with said each of said additional shelves, for sucking air, temperature and humidity of which have been controlled, from said front face opening of said another culturing module and conveying this air toward a rear of said another culturing module so as to circulate this air within said closed structure,
wherein said culturing module and said another culturing module are arranged such that said front face opening and said another front face opening oppose one another so as to define a work space and an air circulation path therebetween.

18. The system according to claim 1, further comprising:
a carbon dioxide analyzer within said closed structure; and
a carbon dioxide cylinder outside said closed structure for supplying a predetermined amount of carbon dioxide into said closed structure in accordance with an electrical signal sent from said carbon dioxide analyzer.

19. The system according to claim 1, wherein
the rear end of said culturing module is spaced from a wall of said closed structure by a distance within a range of from about 50 mm to 300 mm.

* * * * *